(12) United States Patent
Cooper et al.

(10) Patent No.: US 7,778,469 B2
(45) Date of Patent: Aug. 17, 2010

(54) METHODS AND SYSTEMS FOR DISCRIMINATIVE KEYFRAME SELECTION

(75) Inventors: Matthew L. Cooper, San Francisco, CA (US); Jonathan T. Foote, Menlo Park, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1189 days.

(21) Appl. No.: 10/678,935

(22) Filed: Oct. 3, 2003

(65) Prior Publication Data
US 2005/0074168 A1    Apr. 7, 2005

(51) Int. Cl.
*G06K 9/34*    (2006.01)
*G06K 9/62*    (2006.01)

(52) U.S. Cl. ..................... 382/225; 382/173
(58) Field of Classification Search .................. 382/173
See application file for complete search history.

(56) References Cited

U.S. PATENT DOCUMENTS

| | | | | |
|---|---|---|---|---|
| 6,331,859 | B1 * | 12/2001 | Crinon ....................... | 345/619 |
| 6,473,095 | B1 * | 10/2002 | Martino et al. .............. | 715/726 |
| 6,549,643 | B1 * | 4/2003 | Toklu et al. ................. | 382/107 |
| 2002/0038456 | A1 * | 3/2002 | Hansen et al. ............... | 725/46 |
| 2003/0161396 | A1 * | 8/2003 | Foote et al. ............. | 375/240.01 |

OTHER PUBLICATIONS

Video browsing using clustering and scene transitions on compressed sequences Minerva M. Yeung, Boon-Lock Yeo, Wayne H. Wolf, and Bede Liu, Proc. SPIE 2417, 399 (1995), DOI:10.1117/12.206067.*

S. Robertson and K. Jones, "Simple, proven approaches to text retrieval," *Tech. Rep. TR356, Cambridge University Computer Laboratory*, 1997, http://citeseer.nj.nec.com/robertson97simple.html.

M. Cooper and J. Foote, "Scene Boundary Detection Via Video Self-Similarity Analysis,"*Proc. IEEE Intl. Conf. on Image Processing*, 378-81, 2001.

Ohta, Y-I, Kanade, T., and Sakai, T., "Color Information for Region Segmentation," *Comp. Graphics & Image Processing*, 13:222-241, 1980.

R. Duda and P. Hart, "Pattern Classification and Scene Analysis," *Wiley-Interscience*, 130-159, 1973.

M. W. Berry, S. T.Dumais, and G. W. O'Brien, "Using Linear Algebra for Intelligent Information Retrieval," *SIAM Review*, 37(4):573-595, 1994.

(Continued)

*Primary Examiner*—Bhavesh M Mehta
*Assistant Examiner*—Hadi Akhavannik
(74) *Attorney, Agent, or Firm*—Fliesler Meyer LLP (57) ABSTRACT

Embodiments of the present invention provide a system and method for discriminatively selecting keyframes that are representative of segments of a source digital media and at the same time distinguishable from other keyframes representing other segments of the digital media. The method and system, in one embodiment, includes pre-processing the source digital media to obtain feature vectors for frames of the media. Discriminatively selecting a keyframe as a representative for each segment of a source digital media wherein said discriminative selection includes determining a similarity measure for each candidate keyframe and determining a dis-similarity measure for each candidate keyframe and selecting the keyframe with the highest goodness value computing from the similarity and dis-similarity measures.

22 Claims, 8 Drawing Sheets

OTHER PUBLICATIONS

A. Girgensohn, J. Boreczky, and L. Wilcox, "Keyframe-Based User Interfaces for Digital Video," *IEEE Computer*, Sep. 2001.

A. Girgensohn and J. Boreczky, "Time-Constrained Keyframe Selection Technique," *Proc. IEEE Multimedia Systems*, vol. 1, pp. 756-761, 1999.

U.S. Appl. No. 10/086,817, filed Feb. 28, 2002, Jonathan T. Foote.

S. Uchihashi and J. Foote, "Summarizing Video Using a Shot Importance Measure and a Frame-Packing Algorithm," in *Proc. ICASSP '99*, vol. 6, pp. 3041-3044, 1999.

M. Christel, et al., "Evolving Video Skims into Useful Multimedia Abstractions," *Proc. ACM CHI*, pp. 171-178, 1998.

Q. Huang, Z. Liu, and A. Rosenberg, "Automated Semantic Structure Reconstruction and Representation Generation for Broadcast News," *Proc. SPIE Storage & Retrieval for Still Image and Video Databases*, 1994.

H. Aoki, S. Shimotsuji, and O. Hori, "A Shot Classification Method of Selecting Effective Key-Frames for Video Browsing," *Proc. ACM Multimedia*, 1996.

J. Vermaak, P. Perez, M. Gangnet, and A. Blake, "Rapid Summarisation and Browisng of Video Sequences," *Proc. British Machine Vision Conference*, 2002.

J. Peltonen, J. Sinkkonen, and S. Kaski, "Discriminative Clustering of Text Documents," *Proc. IEEE Intl. Conf. on Neural Information Processing*, vol. 4, pp. 1956-1960, 2002.

\* cited by examiner

METHODS AND SYSTEMS FOR DISCRIMINATIVE KEYFRAME SELECTION

FIELD OF THE INVENTION

The present invention is related to the field of digital media analysis, and more particularly to the field of automatic discriminative digital media analysis.

BACKGROUND

With the advent of the Internet, digital still cameras, and digital video cameras, individuals routinely assemble large collections of "digital media." As those collections grow it becomes more and more difficult to quickly locate and identify a desired item of media for review and/or editing.

Several techniques have been devised in an effort to resolve this problem. For example, some techniques identify a "keyframe" as a representative for that particular item of media. However, one problem with current techniques of keyframe selection is that similar items of digital media (i.e. those containing similar content) will often result in keyframes that are similar to the point of being indistinguishable. That situation is quite common even in professionally-produced digital video. For example, a common film technique is to compose a dialog as a sequence of alternating shots of each speaker. After segmentation, each shot of the same speaker will be quite similar, as it will be taken from the same angle of the same subject with the same lighting, background, etc. Many common video sources share this problem, such as short video clips from a digital camera, or pre-segmented results from a segment-based video repository.

Therefore, it is desirable to produce a system and method which automatically selects keyframes that are both representative of the digital media and distinctive from other selected keyframes.

SUMMARY

Roughly described, embodiments of the present invention provide a system and method for discriminatively selecting keyframes that are representative of segments of a source digital media. The keyframes are selected by pre-processing the source digital media to obtain feature vectors for frames of the media. A candidate keyframe for each segment of the source digital media is then compared with other frames of the same segment to determine a similarity value. The candidate keyframe is also compared with frames from the other segments of the source digital media to determine a dissimilarity measure. A representative keyframe may then be selected by selecting the candidate keyframe that has the highest goodness value, i.e., it is both representative of the segment and distinguishable from other keyframes.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Definitions

"Digital media" as referred to herein includes, but is not limited to, digital video, digital images, digital audio, text, and printable pages.

A "frame" as used herein is any basic sub-unit of a larger item or collection of digital media. For instance, a digital video is a sequence of still images; each still image is described and referred to herein as a frame. Similarly, a collection of digital photographs can be viewed conceptually as a sequence of still images, similar to that of digital video. For such a sequence, or collection, each single photograph is referred to herein as a frame. For streams, documents, or document collections consisting of audio, text, and/or other digital media, a frame is a subset of the collection. Such types of media may be divided into sub-units of any length for analysis. Herein, frames can include audio or text excerpts from longer streams. The use of frame throughout the description is not intended to limit the scope of the invention to digital video or collections of digital images, and is used to refer to any sub-unit of any form of digital media.

As used herein, a "segment" is a set of frames from a larger item or collection of digital media. For example, digital media, may be segmented into groups of frames according to various criteria to facilitate browsing and navigation. A segment may be any portion or subset of a larger item or collection of digital media. Alternatively, a segment could also be the entire item of digital media. For example, a segment may be a collection of digital images, or any portion of a digital video, regardless of its source or length (including the entire video).

As used herein, a "keyframe" is a frame that is selected from a segment (set of frames) as a representative for that segment of digital media.

The examples in the above definitions are not intended to be exhaustive and any other form of digital media is equally applicable to embodiments of the present invention.

Overview

Embodiments of the present invention provide a system and method for discriminatively selecting keyframes as representatives of segments of digital media. Keyframes are selected which are both representative of the segment and different from other keyframes, so that they are visually unique and distinctive. For example, if two video segments include video of the same guest speaker, however, in one segment the person laughs or turns his/her head, the chosen keyframe would reflect such a change, to make the video segment it represents easy to distinguish from other video segments. As will be described in greater detail below, in an embodiment, keyframe selection is accomplished by measuring the similarity of the keyframe to both the segment it came from as well as other segments. In short, embodiments of the present invention provide quantitative methods for selecting keyframes that are both representative and discriminative. In another example, if two chapters of a digital textbook, each chapter being identified as a segment, include similar material, but one chapter includes a summary, the selected keyframe for that chapter would include text from the summary, thereby distinguishing it from the other chapter.

Figure 1:
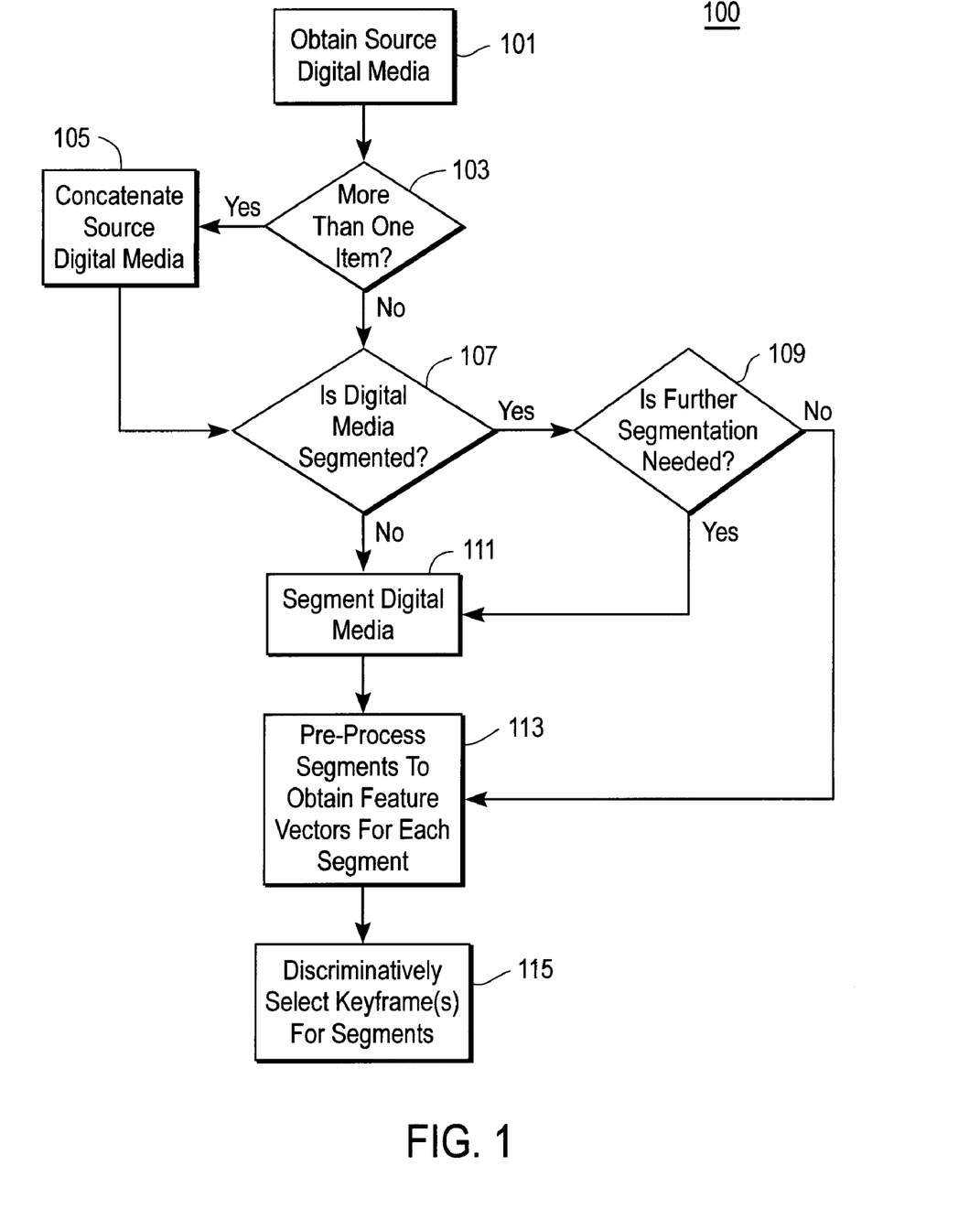
FIG. 1 illustrates a process for discriminatively selecting keyframes according to an embodiment of the present invention.
Figure 3:
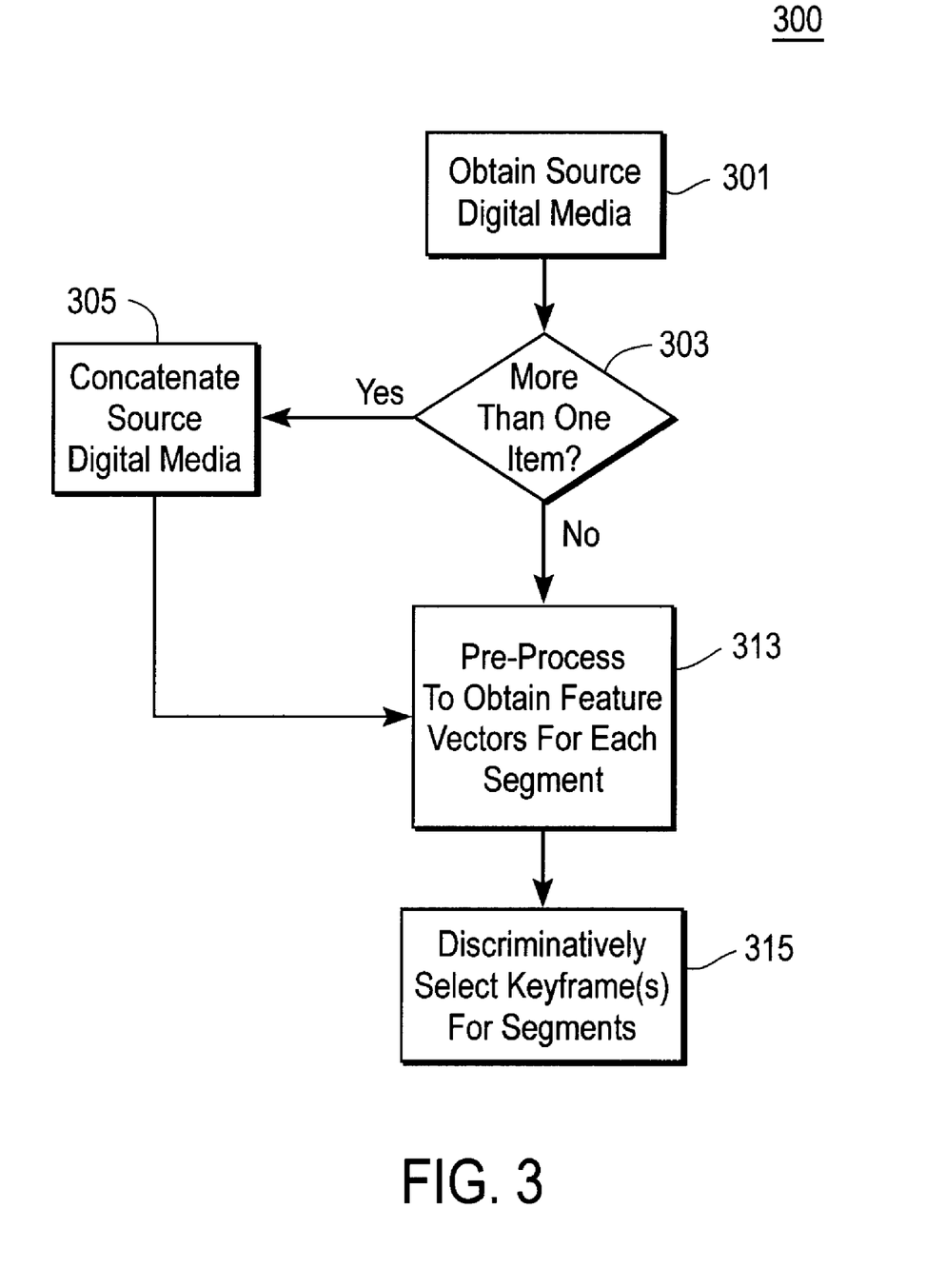
FIG. 3 illustrates another process for discriminatively selecting keyframes according to an embodiment of the present invention.

FIG. 1 illustrates a process for discriminatively selecting keyframes according to an embodiment of the present invention. As one who is skilled in the art would appreciate, FIGS. 1 and 3 illustrate logic blocks for performing specific functions. In alternative embodiments, more or fewer logic blocks may be used. In an embodiment of the present invention, a logic block may represent a software program, a software object, a software function, a software subroutine, a software method, a software instance, a code fragment, a hardware operation or user operation, singly or in combination. For example, the logic blocks may represent discriminative keyframe selection software 512 illustrated in FIG. 5.

The process of FIG. 1 begins in logic block 101 where the system obtains source digital media. The digital media may be any single item of digital media, such as a digital video, or any combination of different items of digital media. For example, referring briefly to FIG. 2A, the digital media obtained in logic block 101 could be a single item of digital media, such as unsegmented digital video $201_1$. Alternatively, the source digital media may be one or more items of digital video, either segmented or unsegmented, and a collection of digital images, such as unsegmented digital video $201_1$, segmented digital video $201_2$, digital image $201_3$, segmented collection of digital images $201_4$, unsegmented collection of digital images $201_6$, unsegmented digital text $201_7$, segmented digital text $201_8$, unsegmented digital audio $201_9$, and segmented digital audio $201_{10}$. Any combination of types of digital media may be utilized by embodiments of the present invention as the source digital media obtained in logic block 101. After obtaining the source digital media in logic block 101, control is passed to logic block 103.

In logic block 103 a determination is made as to whether the source digital media contains more than one item of digital media. If it is determined that the source digital media contains more than one item of digital media, control is passed to logic block 105. If however, it is determined in logic block 103 that the source digital media includes only one item of digital media, control is passed to logic block 107.

Figure 2A:
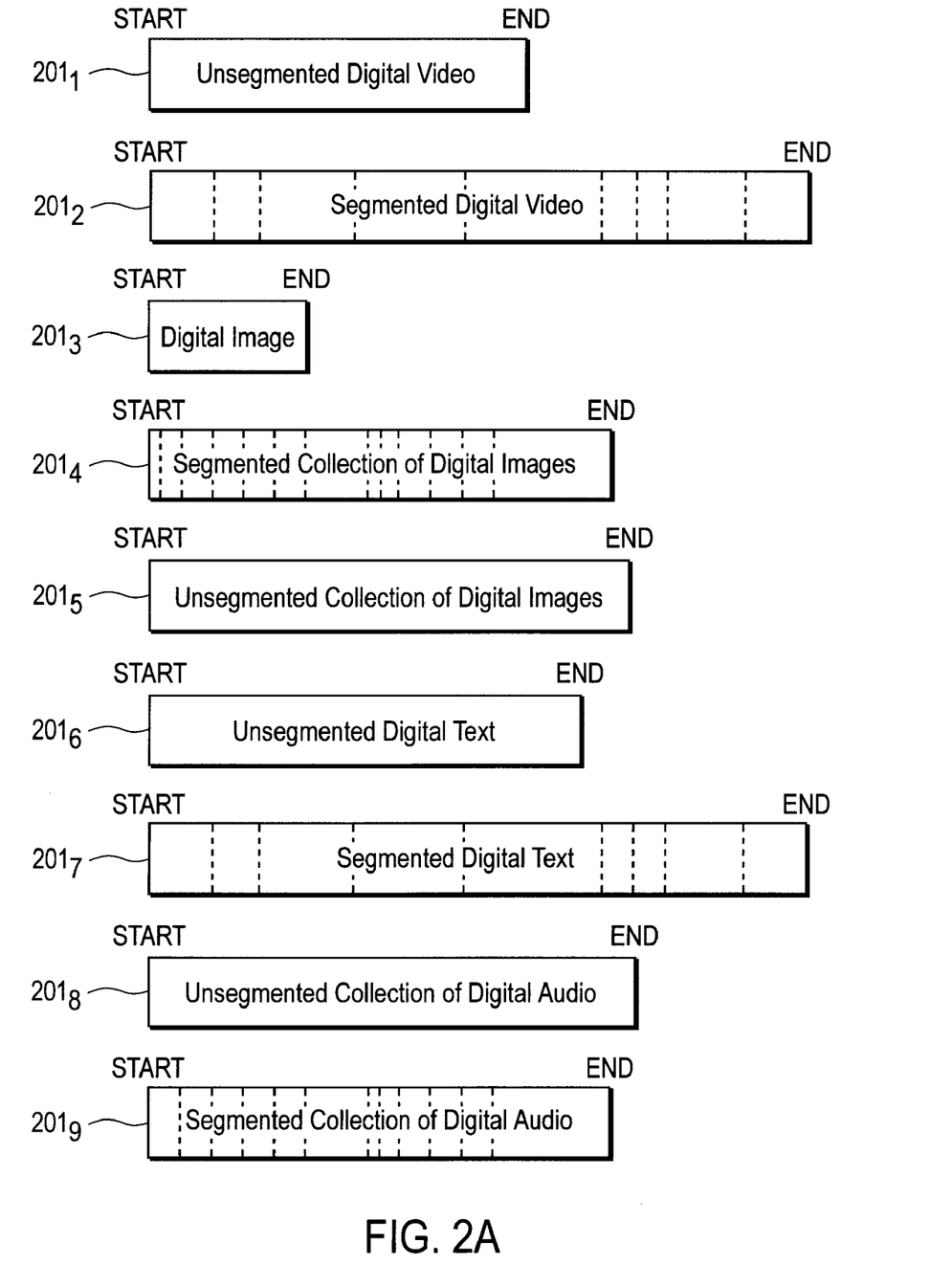
FIG. 2A illustrates a block diagram of different types of digital media, according to an embodiment of the present invention.
Figure 2B:
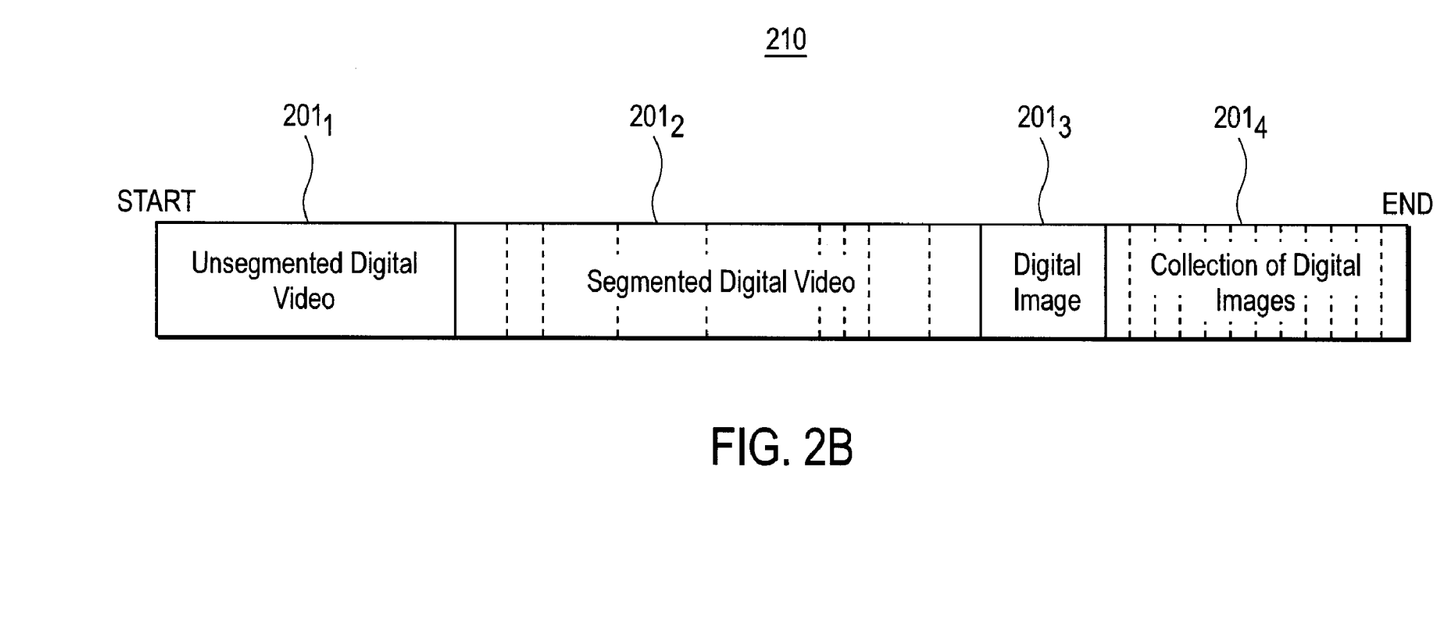
FIG. 2B illustrates a block diagram of source digital media concatenated from several different items of digital media, according to an embodiment of the present invention.

In logic block 105 the multiple items of digital media are concatenated into a single source having a start and end, for analysis purposes. For example, as illustrated in FIG. 2B, if the source digital media includes unsegmented digital video $201_1$, segmented digital video $201_2$, digital image $201_3$, and unsegmented collection of digital images $201_4$, in logic block 105 those items of digital media are all concatenated and treated as a single item of digital media 210 for analysis and ultimate extraction of keyframes, as illustrated in FIG. 2B. The original ending and beginning points of each item of digital media, when concatenated, are treated as a segment boundary in the concatenated source digital media. Upon concatenation, control is passed to logic block 107 and the process continues.

In logic block 107 a determination is made as to whether the source digital media has been segmented. As described in more detail below, segmentation may occur in a multitude of ways and any segmentation technique may be utilized with embodiments of the present invention. If it is determined in logic block 107 that the source digital media has been segmented, control is passed to logic block 109. If, however, it is determined that the source digital media has not been segmented, control is passed to logic block 111.

In logic block 109 a determination is made as to whether additional segmentation of the source digital media is necessary or requested. This decision may be made automatically or at the request of a user. If a user simply requests additional segmentation, control is passed to logic block 111 and the process continues. Automatic determination of segmentation may be made based on the length of existing segments and/or based upon a calculated value of scene changes throughout the existing segments. For example, additional segmentation may be determined for source digital media 210 because of unsegmented digital video $201_1$. After concatenation, unsegmented digital video $201_1$ is treated as one segment of source digital media 210. Based on an analysis of source digital media 210, several scene changes may be identified throughout segment 201, thereby indicating a need for additional segmentation.

Assume for discussion, that unsegmented digital video $201_1$ contains a scene of a birthday party, a scene of a vacation to Hawaii, and a scene of a vacation to the mountains. By computing a difference between consecutive frames it is determined that there are multiple scenes that are not segmented. Upon such a determination the system may either automatically pass control to logic block 111 or alternatively, indicate to a user that it may be beneficial to perform additional segmentation and request a decision as to whether that segmentation should be performed. If additional segmentation is to be performed, control is passed to logic block 111 and the process continues.

Alternatively, if it is either determined automatically, or from user input, that additional segmentation is not necessary, control is passed to logic block 113. User input in this decision would be a user simply indicating that additional segmentation is not desired. If the determination is performed automatically, such a result may occur if all scenes are currently segmented or if there is only one scene. For example, if the source digital media only contained a segmented collection of digital images $201_4$, the system would determine that additional segmentation is not necessary and control would be passed to logic block 113.

In logic block 111 the source digital media is segmented. Embodiments of the present invention do not rely on any particular segmentation technique and any one may be utilized. Additionally, segmentation may be performed on source digital media that has not been segmented at all or only partially segmented. Examples of segmentation techniques that may be utilized by embodiments of the present invention include, but are not limited to, manual segmentation by a user, automatic segmentation based upon thresholding inter-frame differences, histogram-based measure of frame differences, and utilizing self-similarity, as described in "Scene Boundary Detection via Video Self-Similarity Analysis," by Matthew Cooper and Jonathan Foote, 2001, incorporated herein by reference. Additionally, U.S. Pat. No. 6,542,869 titled "Method For Automatic Analysis Of Audio Including Music And Speech," to inventor Jonathan Foote, which is incorporated herein by reference, describes additional similarity-based segmentation techniques which may be utilized with embodiments of the present invention. Once the source digital media has been segmented, control is passed to logic block 113.

In logic block 113 the frames of the digital media are parameterized to obtain a feature vector representative of those frames. In embodiments of the present invention, each frame of the source digital media may be parameterized. Alternatively, to decrease processing time, only a portion of the frames may be parameterized, such as every other frame, every third frame, or any other combination of frames. In still another embodiment, collections of frames may be parameterized together and a single feature vector may be generated for each collection of frames.

Any parameterization technique may be utilized to obtain feature vectors. For example, feature vectors may be computed based on low-order discrete cosine transform ("DCT") coefficients. In such an embodiment, the source digital media may be sampled at a particular frequency to obtain the frames which are transformed into the Ohta color space in which the three channels are approximately decorrelated. The DCT of each transformed channel is computed and a feature vector is formed by concatenating the resulting 25-49 low frequency coefficients of the three channels. The transform method is optimized for analysis (and, if desired, computational complexity) rather than dimension reduction or fidelity. The result is a compact feature vector or reduced coefficients for each sampled video frame. Such a representation is appropriate for quantifying similarity, because similar frames will obtain similar transform coefficients (feature vectors). Upon determination of feature vectors, control is passed to logic block 115.

In logic block 115 the feature vectors are analyzed and a keyframe(s) is selected as the representative for each segment. A detailed discussion of various techniques for selecting keyframes will be described in detail below. Once the keyframes are selected the system may then display those frames to a user in any variety of organizational techniques.

It will be understood that the process described with respect to FIG. 1 can be implemented in a different configuration or arrangement, performing steps described by logic blocks in a different order, utilizing additional steps or utilizing fewer steps. For example, in an embodiment, the step of pre-processing 113 may be performed after logic blocks 103 and 105 and prior to the segmentation determination and segmentation of logic blocks 107, 109, and 111.

Yet another embodiment of a method for discriminatively selecting keyframes is illustrated in FIG. 3. The process 300 begins at logic block 301 by obtaining source digital media. As discussed above with respect to logic block 101 of FIG. 1, the obtained source digital media may be any form and combination of digital media and may be obtained from multiple sources. Once the digital media is obtained, control is passed to logic block 303 and a determination is made, similar to that described with respect to logic block 103, as to whether the source digital media contains more than one item of digital media. If it is determined that the source digital media contains more than one item of digital media, control is passed to logic block 305. If however, it is determined that the source digital media does not contain more than one item of digital media, control is passed to logic block 313.

In logic block 305, as described with respect to logic block 105, the multiple items of digital media are concatenated into one item of source digital media for processing and selection of keyframes. After the media is concatenated, control is passed to logic block 313 where the source digital media is pre-processed using any of the above techniques described with respect to logic block 113 to obtain feature vectors for each frame, portion of frames, or groups of frames. Control is then passed to logic block 315. As described in detail below, and outlined above with respect to logic block 115, in logic block 315 a keyframe is discriminatively selected using one of a variety of keyframe selection techniques.

Distinct from the previous embodiment, the embodiment described with respect to FIG. 3 does not include segmentation. Instead, the source digital media is presumed to have already been segmented. However, the process is still applicable to data that is not previously segmented. For example, if there is only one item of digital media that was obtained it will be treated as one segment and one keyframe will be generated. If multiple items of digital media were included in the source digital media, after concatenation each original item will be considered as a separate segment and a keyframe for each of those segments and/or any other segments will be generated.

Figure 5:
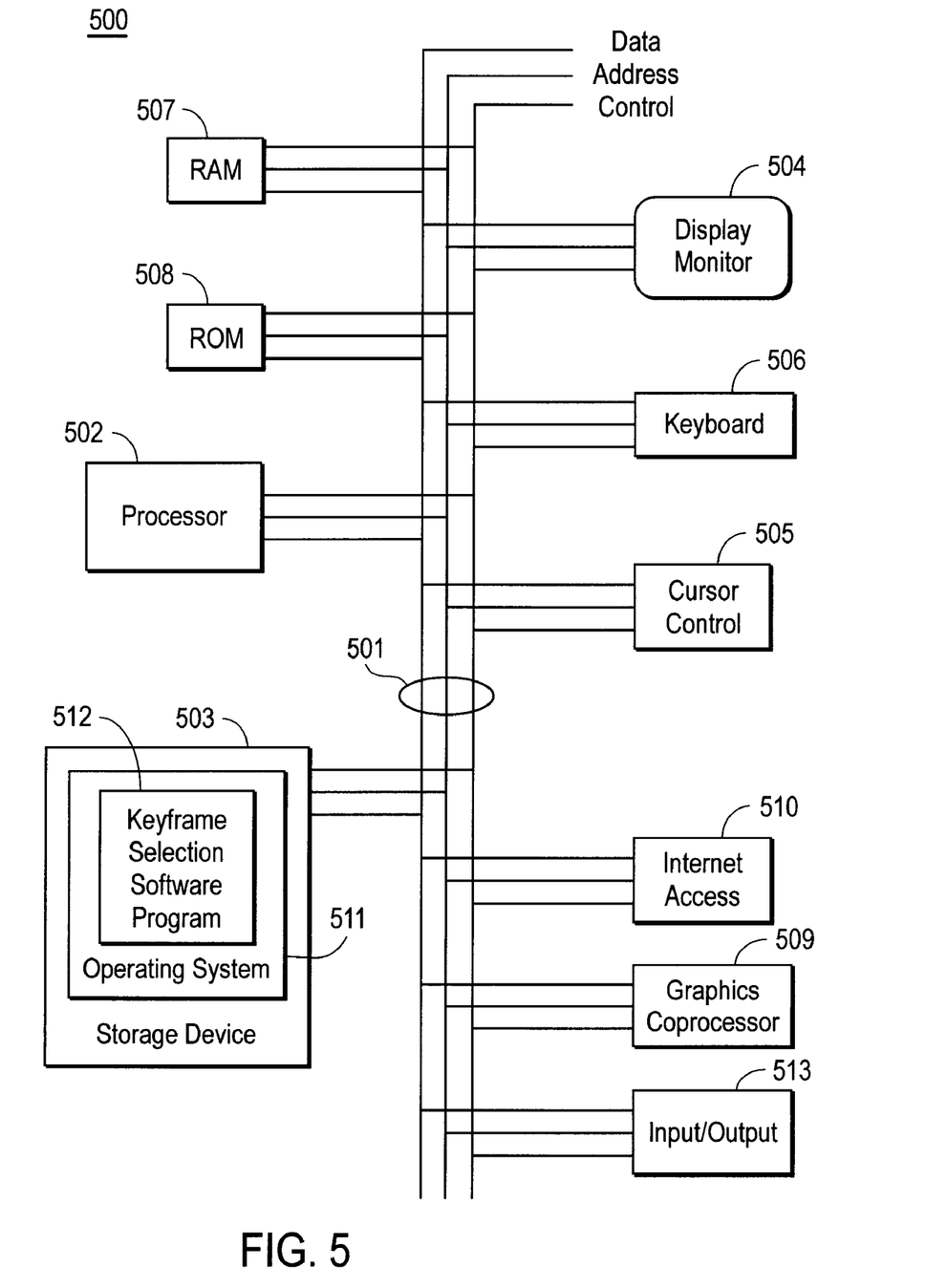
FIG. 5 illustrates a block diagram of a general purpose computing system which may be utilized to execute embodiments of the present invention.

FIG. 5 illustrates a computing device architecture 500 suitable for implementing embodiments of the present invention. The computing device architecture 500 includes a processor 502, a storage device 503, and a display monitor 504. The architecture 500 may also include Internet access equipment 510, such as a modem, input/output 513, cursor control device 505, Random Access Memory ("RAM") 507, Read Only Memory ("ROM") 508, keyboard 506, and a graphics co-processor 509. All of the elements of the computing device architecture 500 may be tied together by a common bus 501 for transporting data between the various elements. The bus 501 typically includes data, address, and control signals.

Embodiments of the present invention are executable on any computing device architecture such as the one 500 illustrated in FIG. 5, but there is no limitation that this architecture is the only one which can execute embodiments of the present invention.

In an embodiment of the present invention, the storage device 503 may be an article of manufacture, such as a computer readable medium. For example, storage device 503 may be a magnetic hard disk, an optical disk, a floppy disk, CD-ROM (Compact Disk Read-Only Memory), RAM (Random Access Memory), ROM (Read-Only Memory), or other readable or writeable data storage technologies, singly or in combination.

Storage device 503 may include an operating system 511, such as Microsoft Windows®, Apple Macintosh OS®, or Unix®, wherein the operating system 511 is capable of executing programs or applications using computing device architecture 500. An embodiment of the present invention is implemented as keyframe selection software program 512, and is stored on storage device 503.

As will be understood, embodiments of the present invention, such as keyframe selection software program 512, may be in the form of a software program, a software object, a software function, a software subroutine, a software method, a software instance, a code fragment, a hardware operation or user operation, singly or in combination. Additionally, keyframe selection software program 512 may be implemented using one, two, or any number of computing devices 500.

Discriminative Keyframe Selection

According to an embodiment, discriminative selection of keyframe(s), as identified by logic blocks 115 and 315, is based on the feature vectors generated in logic blocks 113 and 313. The feature vectors may be compared, and a keyframe selected, using any one of a number of similarity-based considerations, or based upon a linear discriminant-based implementation.

Regardless of the keyframe selection technique, there are computational considerations for regenerating keyframes at a later point in time. One consideration is the costs of updating keyframes as additional videos or images are added to a collection. For example, thumbnails are commonly used by digital photo organization software in light-tables. Users often group photos into "events," each of which may be treated as a segment and represented by a keyframe in a higher level view of the collection. If additional photos are added, it could be desirable to update the keyframes to provide further discrimination.

One similarity-based approach used in an embodiment of the present invention induces O(N) complexity, where N is the total number of frames, to add an additional row and column to a similarity matrix. The linear discriminant technique, as will be discussed below, is more costly in updating previously-generated keyframes. Because $W_{FLD}$ is comprised of generalized eigenvectors as will be discussed below, "folding-in" techniques, such as those described in "Using Linear Algebra For Intelligent Information Retrieval," by M. W. Barrey, S. T. Dumais, and G. W. O'Brien, *SIAM Review* 37(4):573-595, 1995, are applicable for adding frames and updating the analysis. These costs are approximately O(ND).

Other computational enhancements consider only a subset of all video frames when computing or updating C. One approach is to only use the set of already-chosen keyframes $\{v_k^*\}$ to recalculate C. Other computational considerations may also be taken into account when utilizing embodiments of the present invention.

Similarity-Based Discriminative Keyframe Selection

Using a similarity-based implementation, candidate keyframes can be compared to other frames within a segment (referred to herein as "in-class frames") to determine how well it represents the segment (similarity) and compared with frames of other segments (referred to herein as "out-of-class frames") to determine how distinguishable it is from those frames (dis-similarity).

For ease of explanation purposes, we will discuss a source digital video having N frames. This explanation is not intended to be limiting in any way and any other form of digital media may be utilized.

The frame-indexed set of feature vectors, discussed above, may be denoted as $V=\{v_i: i=1,\ldots,N\}$. Consider a segment Q of the digital video consisting of the feature vectors $v_l$ to $v_r$, i.e., $Q=\{v_i: i=l,\ldots,r\} \subset V$. A distance measure $d(.,.)$ is chosen to quantify the similarity of two frames. The average similarity S for any candidate keyframe $v_j \in Q$ and the segment, Q, is $$S(j, Q) = \frac{1}{|Q|} \sum_{v_m \in Q} d(v_j, v_m) \quad (1)$$

S is the average in-class similarity of keyframe $v_j$; in other words, the similarity of keyframe $q_r$ to the segment it came from. C is the average out-of-class similarity, or the similarity of keyframe $v_j$ to other segments of the digital media, $$\bar{Q} \equiv V - Q = \{v_i : v_i \in V, v_i \notin Q\}$$

Define C as $$C(j, Q) = \frac{1}{|\bar{Q}|} \sum_{v_m \in \bar{Q}} d(v_j, v_m). \quad (2)$$

Figure 4:
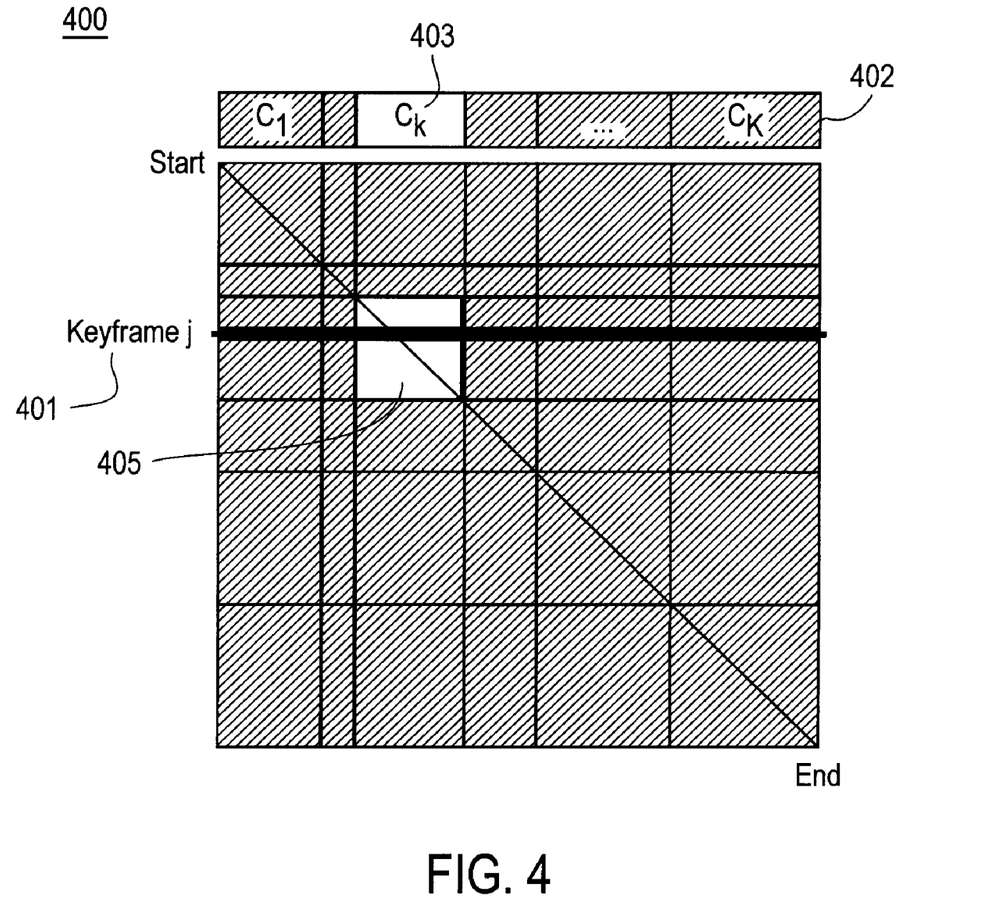
FIG. 4 illustrates a similarity matrix S generated according to an embodiment of the present invention.

As illustrated in FIG. 4, the use of a similarity matrix S with elements $S(i,j)=d(v_i, v_j)$ facilitates these calculations. A good representative keyframe j 401 will have a high in-class value of S—in other words, it will be very similar, on average, to the constituent frames of the segment it came from. Referring to matrix 400, the average in-class value S for candidate keyframe j 401 is determined by comparing keyframe j to each of the other in-class frames of segment $C_k$ 403. The in-class frames of segment $C_k$ 403 are represented as the empty square 405 of matrix 400.

To be discriminative, the candidate keyframe j 401 should also minimize C—it should not resemble, as much as possible, the frames, and hence the keyframes, from the other segments. The out-of-class measure C for keyframe j 401 is determined by comparing keyframe j 401 to the out-of-class frames of digital media 402. Measures of the difference and/or ratio of the two values S and C indicate how well a candidate keyframe simultaneously satisfies both criteria.

Thus a subtractive figure of merit may be calculated as $$F_S(j,Q)=S(j,Q)-C(j,Q) \quad (3)$$

while a rational figure of merit may be calculated as $$F_R(j, Q) = \frac{S(j, Q)}{C(j, Q)}, \quad (4)$$

where the subscripts S and R indicate the subtractive and rational forms, respectively.

In an alternative embodiment, it may be desirable to trade off or bias the discrimination versus self-similarity measures. In these cases, a weighted measure may be determined using non-negative constants $\alpha_S$ and $\beta_S$ as follows:

$$F_S(j,Q)=\alpha_S S(j,Q)-\beta_S C(j,Q) \quad (5)$$

while a rational weighted figure of merit using constants $\alpha_S$ and $\beta_S$ would be computed as $$F_R(j, Q) = \frac{(S(j, Q))^{\alpha_r}}{(C(j, Q))^{\beta_r}}. \quad (6)$$

The subscripts s and r indicate the constant is for the subtractive or rational forms, respectively. In both cases, increasing $\alpha$ relative to $\beta$ will increase the importance of self-similarity; the opposite will increase the discrimination of the resulting keyframes.

To select the best representative keyframe v* for a segment Q, we maximize the goodness function F over all frames in Q:

$$v^* = \arg\max_{v_j \in Q} F(j, Q). \quad (7)$$

Multiple Keyframes for Each Segment

In alternative embodiments, a user can select multiple keyframes to represent each segment. In such an embodiment, the average self-similarity S between the segment $Q=\{v_l,\ldots,V_r\}$ and the subsegment $P=\{v_j,\ldots,v_k\} \subset Q$ is $$S(P, Q) = \sum_{v_n \in P} S(n, Q) = \frac{1}{|P||Q|} \sum_{v_n \in P} \sum_{v_m \in Q} d(v_n, v_m). \quad (8)$$

Cross-similarity is defined relative to the segmentation:

$$C(P, Q) = \sum_{v_n \in P} C(n, Q) = \frac{1}{|P||Q|} \sum_{v_n \in P} \sum_{v_m \in Q} d(v_n, v_m). \quad (9)$$

Utilizing the results of equations (8) and (9), desired keyframes may be selected using any one modified version of equations (3), (4), (5), or (6) as identified by equations (10), (11), (12), and (13) respectively:

$$F_S(P, Q) = S(P, Q) - C(P, Q) \quad (10)$$

$$F_R(P, Q) = \frac{S(P, Q)}{C(P, Q)}, \quad (11)$$

$$F_S(P, Q) = \alpha_S S(P, Q) - \beta_S C(P, Q) \quad (12)$$

$$F_R(P, Q) = \frac{(S(P, Q))^{\alpha_r}}{(C(P, Q))^{\beta_r}}. \quad (13)$$

To select the best group of representative keyframes v* for a segment Q, we maximize the goodness function F over all frames in Q:

$$v^* = \arg\max_{v_P \in Q} F(P, Q) \quad (14)$$

Linear Discriminant Keyframe Selection

In yet another embodiment, keyframes may be selected utilizing linear discriminants. Spectral methods have been used with considerable success for indexing text document collections for information retrieval. One example is latent semantic indexing (LSI). Such techniques are used to achieve dimension reduction by neglecting non-essential variations in the feature space. In classification scenarios, linear methods for dimension reduction can additionally exploit labeled training data to "shape" the scatter in the reduced dimension space and facilitate discrimination.

Fisher's linear discriminant is an example of such a technique. Returning to the frame-indexed set of feature vectors V={$v_1, \ldots, N$} after segmentation, V is partitioned into K segments, and hence features:

$$V = \bigcup_{k=1,\ldots,K} C_k \quad (15)$$

such that each feature vector $v_i$ is an element of exactly one segment $C_k$. For each of the segments, the mean feature vector, $\mu_k$ is computed:

$$\mu_k = \frac{1}{N_k} \sum_{v_i \in C_k} v_i, \quad (16)$$

where $N_k$ is the number of frames in segment $C_k$. $\mu$ denotes the mean feature vector computed for the entire video. Then, define the in-class scatter matrix $$S_W = \sum_{k=1}^{K} \sum_{v_i \in C_k} (v_i - \mu_k)(v_i - \mu_k)^T, \quad (17)$$

and the out-of-class scatter matrix $$S_B = \sum_{k=1}^{K} N_k (\mu_k - \mu)(\mu_k - \mu)^T. \quad (18)$$

For a desired dimension D, the transformation is $$W_{FLD} = \arg\max_w \frac{|W^T S_B W|}{|W^T S_W W|} \quad (19), (20)$$

$$W_{FLD} = [w_1, \ldots, w_D].$$

The column vectors $w_i$ are the generalized eigenvectors with the D largest eigenvalues satisfying $$S_B w_i = \lambda_i S_W w_i. \quad (21)$$

$W_{FLD}$ projects the feature-frame data to the D×N matrix U=$W_{FLD}^T$V. The transformation is optimized to cluster features extracted from frames of the same segment, while simultaneously separating these features from those of other segments. As a result, keyframe selection is as simple as determining the frame whose feature vector is closest to each segment's mean feature vector. By linearity, $$\bar{\mu}_k = W_{FLD}^T \mu_k, \ k=1, \ldots, K. \quad (22)$$

The keyframe for each segment is then selected based upon $$v_k^* = \underset{v_j \in C_k}{\text{ArgMin}} \|(W_{FLD}^T v_j) - \bar{\mu}_k\|, \quad (23)$$

or equivalently, $$v_k^* = \underset{v_j \in C_k}{\text{ArgMin}} \|W_{FLD}^T (v_j - \mu_k)\|. \quad (24)$$

The dimension reduction emphasizes the representative modes within the feature data for each class and ignores anomalous variations. At the same time, the linear discriminant projection is designed to transform the features to help distinguish among the classes. The modes in the transformed feature space are jointly optimized for discrimination. This provides a principled approach for simultaneous dimension reduction and keyframe selection.

EXAMPLE

For discussion purposes only, below is an example of discriminatively selecting keyframes for a collection of digital media, according to an embodiment of the present invention. This example is to aid in understanding the use of embodiments of the present invention and is not intended to be limiting in any way.

Figure 6A:
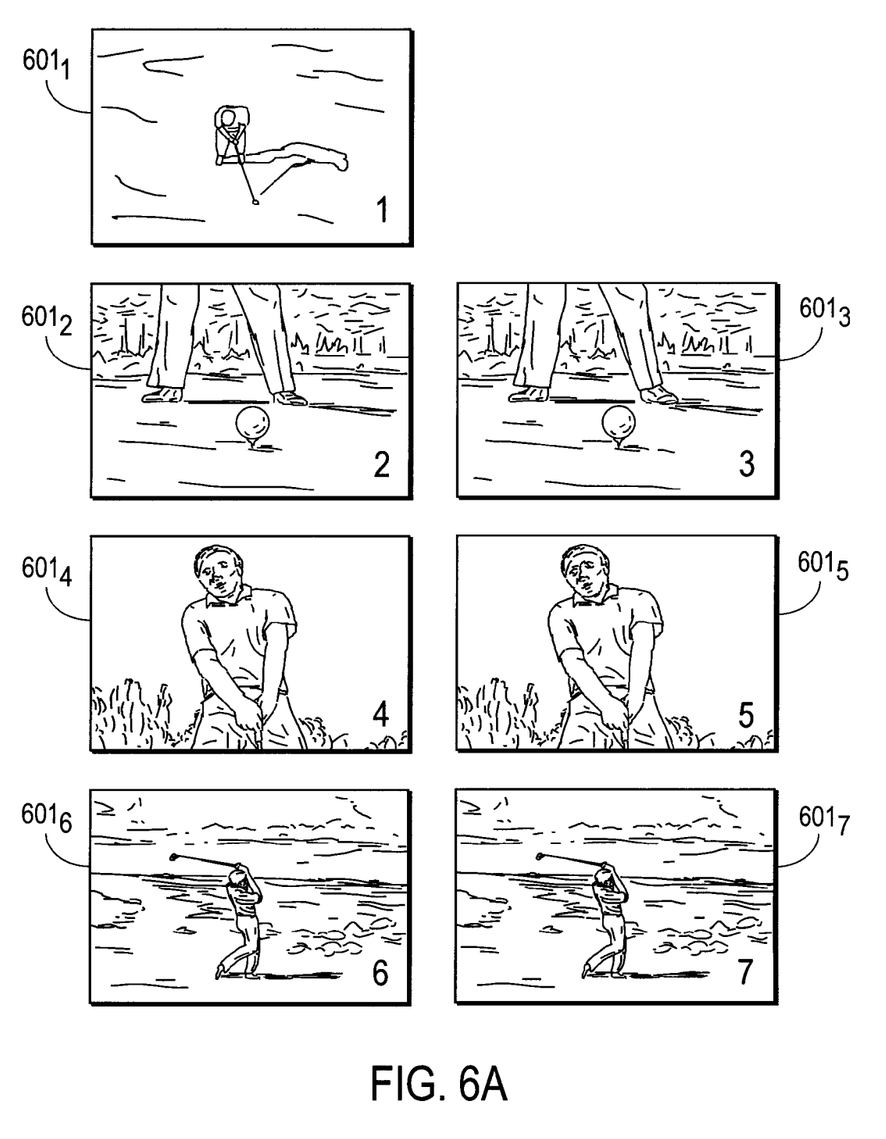
FIG. 6A illustrates a group of keyframes of seven video segments generated using non-discriminative keyframe selection.
Figure 6B:
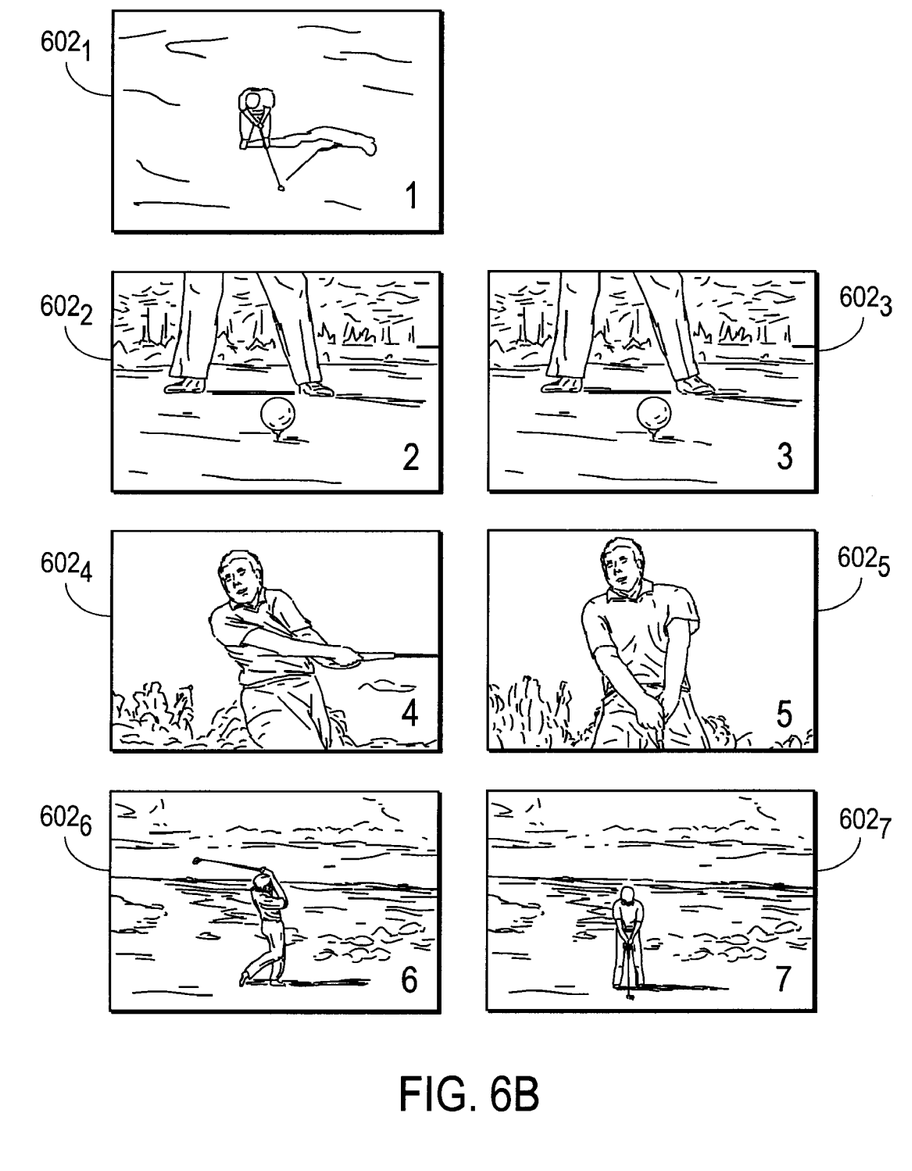
FIG. 6B illustrates a group of keyframes of seven video segments generated using discriminative keyframe selection, according to an embodiment of the present invention.

FIGS. 6A and 6B illustrate the results of keyframe selection for a source digital media, in this example a digital golf instructional video utilizing the prior art (FIG. 6A) and an embodiment of the present invention (FIG. 6B). The source digital media is segmented into seven different segments, each segment representing a different golf swing contained within the source digital media. The source digital media contains several very similar shots, that differ only in slight details. After segmentation, feature vectors are computed for the frames of each segment. Those feature vectors are compared and keyframes for the segments selected and identified.

FIG. 6A illustrates keyframes $601_1$, $601_2$, $601_3$, $601_4$, $601_5$, $601_6$, $601_7$, chosen utilizing the prior art, non-discriminative technique of selecting keyframes from the source digital media. In contrast, FIG. 6B illustrates the results of discriminative keyframe selection, implemented according to an embodiment of the present invention. The difference is apparent: the discriminatively-chosen keyframes $602_1$, $602_2$, $602_3$, $602_4$, $602_5$, $602_6$, $602_7$, are distinctly different for six of the seven segments, while the non-discriminative technique resulted in only four unique keyframes as illustrated in FIG. 6A. In this example, low-order DCT coefficients were used for the frame parameters, and the cosine distance metric was used to generate a similarity matrix, as described in U.S. Pat. No. 6,542,869, incorporated above, and illustrated in FIG. 4.

Thus utilizing discriminative keyframe selection, a user is provided with keyframes that are representative of each segment and at the same time distinguishable from one another.

INDUSTRIAL APPLICABILITY

Embodiments of the present invention have applications in any scenario where digital media is to be managed or manipulated. Examples include video editing software, video still cameras, graphical file browsers, and set-top boxes and PVRs. Many software packages for video editing use keyframes as icons to represent video clips, for selection and editing. Having distinctive keyframes can be a particular help when selecting from multiple versions ("takes") of the same shot, as can be seen from FIG. 6B.

Video still cameras with capacious hard-disk storage are just coming onto the market, and digital still cameras that can record short video clips are also popular. All of these devices typically have a way to browse already-recorded media, usually on a small display. Using discriminative keyframes can usefully represent stored media, and help the user avoid mistakes, such as deleting the wrong "take" of a recorded scene.

Most desktop windowing systems include a "preview" mode that allows graphical data files to be seen as thumbnail images. Discriminative keyframe selection is especially useful here, when browsing large directories that might contain many video segments. As previously noted, embodiments of the present invention are suitable for any set and/or form of digital media. For example, a discriminative keyframe can be selected to represent a collection of images in exactly the same way as a video segment. Image management programs that operate on groups of images—such as image folders or directories—would benefit from embodiments of the present invention as well, because entire collections could be represented with a single discriminative keyframe.

Personal video recorders (and increasingly, set-top television decoder boxes) have a similar media management conundrum: how to represent and select from many video files with a simple, easy interface. Adding discriminative keyframes to the interface would allow users to better select between, for example, different editions of a talk show, that may have very similar content in regard to camera placement, set design and lighting, and presenter.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

We claim:

1. A computer implemented method for discriminatively selecting keyframes representative of segments of a source digital media, comprising the steps of:
   obtaining said source digital media for which keyframes are to be selected, wherein said source digital media comprises a plurality of segments, wherein said plurality of segments comprises a plurality of frames, said plurality of frames comprising candidate keyframes;
   pre-processing said source digital media to obtain a plurality of feature vectors, said feature vectors being representative of the candidate keyframes;
   determining in-class similarity values for said candidate keyframes, wherein the in-class similarity values are determined by comparing the feature vectors for the candidate keyframes to other feature vectors found solely within the same segment the candidate keyframes come from;
   determining out-of-class similarity values for said candidate keyframes, wherein the out-of-class similarity values are determined by comparing the feature vectors for the candidate keyframes to other feature vectors found solely outside of the segment the candidate keyframes come from;
   discriminatively selecting a keyframe for each segment based on both the in-class similarity values and the out-of-class similarity values of the candidate keyframes, wherein each selected keyframe is both representative of the segment the selected keyframe originates from and distinguishable from other selected keyframes which are representative of the remaining plurality of segments;
   wherein the chronological order of the selected keyframes as they appear within the source digital media is maintained during the step of discriminatively selecting a keyframe for each segment; and
   wherein the method steps are done by at least one processor.

2. The method of claim 1, wherein said source digital media includes a plurality of items of digital media.

3. The method of claim 2, comprising the step of:
   concatenating said plurality of items of digital media into one item of source digital media.

4. The method of claim 1, wherein said source digital media is digital video.

5. The method of claim 1, wherein said source digital media is a digital image.

6. The method of claim 1, wherein said source digital media is digital audio.

7. The method of claim 1, wherein said source digital media is a digital text.

8. The method of claim 1, wherein said source digital media is a concatenation of digital video and a digital image.

9. The method of claim 1, further comprising the step of:
   determining, subsequent to said step of obtaining, if said source digital media includes more than one item of digital media.

10. The method of claim 9, further comprising the step of:
    concatenating said digital media into one item of source digital media if it is determined that said source digital media includes more than one item of digital media.

11. A computer-readable medium having executable instructions stored thereon that performs the method of discriminatively selecting keyframes representative of digital media, comprising the steps of:

obtaining said digital media for which keyframes are to be selected;

segmenting said digital media into a plurality of segments, wherein said plurality of segments comprises a plurality of frames, said plurality of frames comprising candidate keyframes;

pre-processing said digital media to obtain a plurality of feature vectors, said feature vectors being representative of the candidate keyframes;

determining in-class similarity values for said candidate keyframes, wherein the in-class similarity values are determined by comparing the feature vectors for the candidate keyframes to other feature vectors found solely within the same segment the candidate keyframes come from;

determining out-of-class similarity values for said candidate keyframes, wherein the out-of-class similarity values are determined by comparing the feature vectors for the candidate keyframes to other feature vectors found solely outside of the segment the candidate keyframes come from;

discriminatively selecting a keyframe for each segment based on both the in-class similarity values and the out-of-class similarity values of the candidate keyframes, wherein each selected keyframe is both representative of the segment the selected keyframe originates from and distinguishable from other selected keyframes which are representative of the remaining plurality of segments; and wherein the chronological order of the selected keyframes as they appear within the source digital media is maintained during the step of discriminatively selecting a keyframe for each segment.

12. The method of claim 1, wherein the candidate keyframe having the largest goodness function value within each segment is discriminatively selected to be the keyframe for the segment it originates from, wherein the goodness function value is calculated based on both the in-class similarity values and the out-of-class similarity values.

13. A computer implemented method for discriminatively selecting keyframes representative of segments of a source digital media, comprising the steps of:

obtaining said source digital media for which keyframes are to be selected, wherein said source digital media comprises a plurality of segments, wherein said plurality of segments comprises a plurality of frames, said plurality of frames comprising candidate keyframes;

pre-processing said source digital media to obtain a plurality of feature vectors, said feature vectors being representative of the candidate keyframes;

determining in-class similarity values for said candidate keyframes, wherein the in-class similarity values are determined by comparing the feature vectors for the candidate keyframes to other feature vectors found solely within the same segment the candidate keyframes come from;

determining out-of-class similarity values for said candidate keyframes, wherein the out-of-class similarity values are determined by comparing the feature vectors for the candidate keyframes to other feature vectors found solely outside of the segment the candidate keyframes come from;

discriminatively selecting a keyframe for each segment based on both the in-class similarity values and the out-of-class similarity values of the candidate keyframes, wherein each selected keyframe is both representative of the segment the selected keyframe originates from and distinguishable from other selected keyframes which are representative of the remaining plurality of segments;

wherein the candidate keyframe having the largest goodness function value within each segment is discriminatively selected to be the keyframe for the segment it originates from, wherein the goodness function value is calculated based on both the in-class similarity values and the out-of-class similarity values;

wherein the goodness function value for each candidate keyframe comprises a subtractive figure, wherein the out-of-class similarity value is subtracted from the in-class similarity value for each candidate keyframe;

wherein the method steps are done by at least one processor.

14. A computer implemented method for discriminatively selecting keyframes representative of segments of a source digital media, comprising the steps of:

obtaining said source digital media for which keyframes are to be selected, wherein said source digital media comprises a plurality of segments, wherein said plurality of segments comprises a plurality of frames, said plurality of frames comprising candidate keyframes;

pre-processing said source digital media to obtain a plurality of feature vectors, said feature vectors being representative of the candidate keyframes;

determining in-class similarity values for said candidate keyframes, wherein the in-class similarity values are determined by comparing the feature vectors for the candidate keyframes to other feature vectors found solely within the same segment the candidate keyframes come from;

determining out-of-class similarity values for said candidate keyframes, wherein the out-of-class similarity values are determined by comparing the feature vectors for the candidate keyframes to other feature vectors found solely outside of the segment the candidate keyframes come from;

discriminatively selecting a keyframe for each segment based on both the in-class similarity values and the out-of-class similarity values of the candidate keyframes, wherein each selected keyframe is both representative of the segment the selected keyframe originates from and distinguishable from other selected keyframes which are representative of the remaining plurality of segments;

wherein the candidate keyframe having the largest goodness function value within each segment is discriminatively selected to be the keyframe for the segment it originates from, wherein the goodness function value is calculated based on both the in-class similarity values and the out-of-class similarity values;

wherein the goodness function value for each candidate keyframe comprises a rational figure, wherein the in-class similarity value is divided by the out-of-class similarity value for each candidate keyframe; and wherein the method steps are done by at least one processor.

15. A computer implemented method for discriminatively selecting keyframes representative of segments of a source digital media, comprising the steps of:

obtaining said source digital media for which keyframes are to be selected, wherein said source digital media comprises a plurality of segments, wherein said plurality of segments comprises a plurality of frames, said plurality of frames comprising candidate keyframes;

pre-processing said source digital media to obtain a plurality of feature vectors, said feature vectors being representative of the candidate keyframes;

determining in-class similarity values for said candidate keyframes, wherein the in-class similarity values are determined by comparing the feature vectors for the candidate keyframes to other feature vectors found solely within the same segment the candidate keyframes come from;

determining out-of-class similarity values for said candidate keyframes, wherein the out-of-class similarity values are determined by comparing the feature vectors for the candidate keyframes to other feature vectors found solely outside of the segment the candidate keyframes come from;

discriminatively selecting a keyframe for each segment based on both the in-class similarity values and the out-of-class similarity values of the candidate keyframes, wherein each selected keyframe is both representative of the segment the selected keyframe originates from and distinguishable from other selected keyframes which are representative of the remaining plurality of segments;

wherein the candidate keyframe having the largest goodness function value within each segment is discriminatively selected to be the keyframe for the segment it originates from, wherein the goodness function value is calculated based on both the in-class similarity values and the out-of-class similarity values;

wherein the in-class similarity values and the out-of-class similarity values are biased when determining the goodness function value for each candidate keyframe; and wherein the method steps are done by at least one processor.

16. The method of claim 1, wherein said step of discriminatively selecting a keyframe includes the step of discriminatively selecting a plurality of keyframes as being representative of each segment.

17. The method of claim 1, wherein the feature vectors are obtained based on low-order discrete cosine transform coefficients.

18. The method of claim 1, wherein the feature vectors are obtained for a group of frames.

19. The method of claim 1, wherein the feature vectors are obtained for each frame.

20. The method of claim 1, wherein the feature vectors are obtained for only a portion of the frames.

21. The method of claim 1, wherein the in-class similarity values and out-of-class similarity values are determined utilizing linear discriminant analysis.

22. The method of claim 1, wherein the in-class similarity values and out-of-class similarity values are determined using latent semantic indexing.

* * * * *